UNITED STATES PATENT OFFICE.

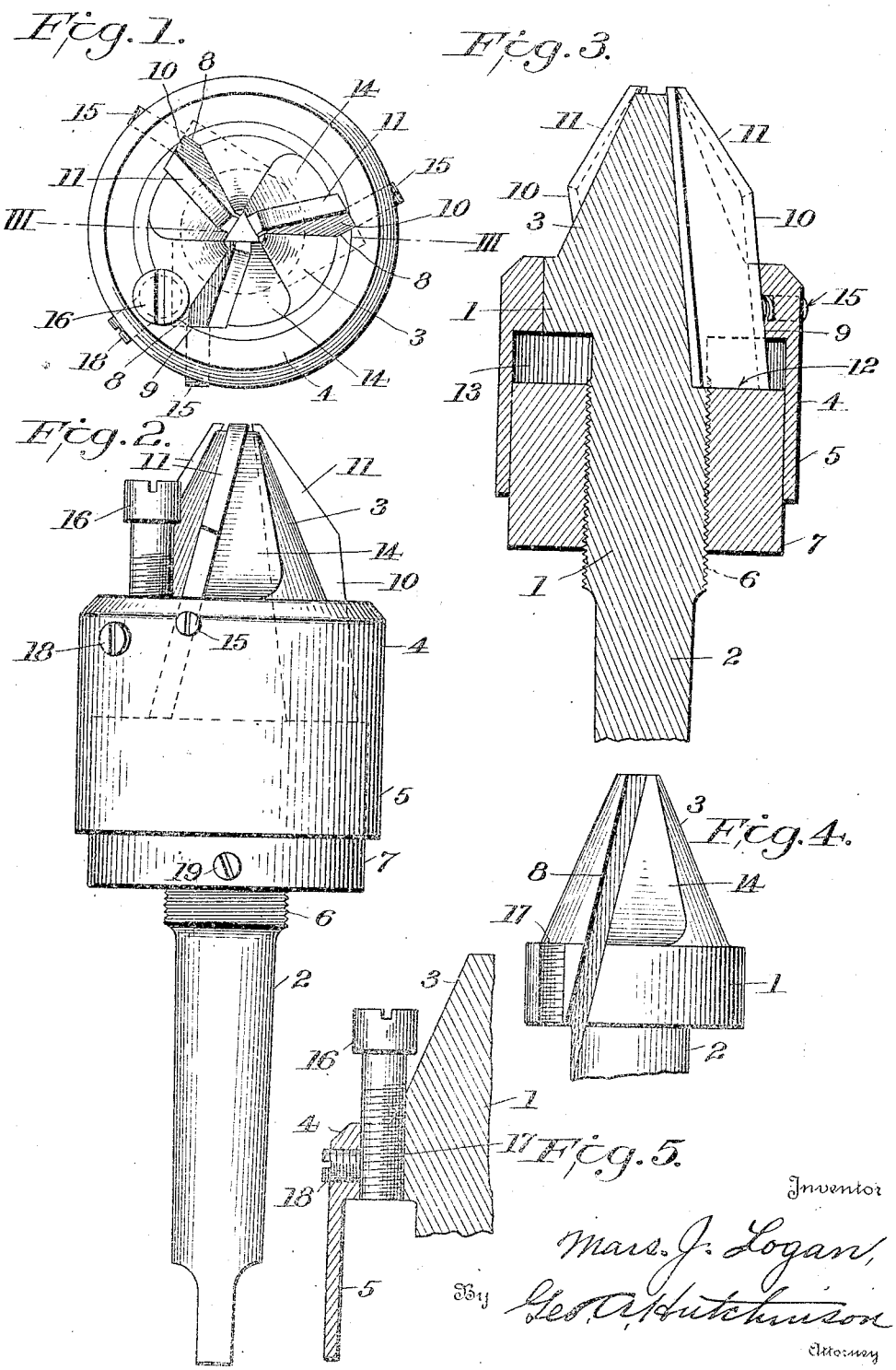

MARSELIUS J. LOGAN, OF SPRINGFIELD, VIRGINIA, ASSIGNOR OF ONE-HALF TO LAURENCE G. ALEXANDER, OF ALEXANDRIA, VIRGINIA.

COUNTERSINK.

1,377,495.   Specification of Letters Patent.   Patented May 10, 1921.

Application filed February 14, 1920. Serial No. 358,786.

*To all whom it may concern:*

Be it known that I, MARSELIUS J. LOGAN, a subject of the King of Norway, residing at Springfield, in the county of Fairfax and State of Virginia, have invented certain new and useful Improvements in Countersinks, of which the following is a full, clear, and exact specification.

This invention relates to tools for boring or cutting countersinks, and has for its object to provide a tool of this kind which is durable, accurate and readily adjustable for cutting various sizes or depths of countersinks.

The invention contemplates the use of a plurality of cutters or knives, and the provision of means for simultaneously and accurately adjusting all of said cutters for insuring each doing the same amount of work and producing an even cut. Means is also provided for limiting the depth of the bore, or stopping the tool when a countersink has been cut to the required depth, said stop when set serving to insure any number of countersinks being cut to a uniform depth or size.

The invention will be first hereinafter described in connection with the accompanying drawings, which constitute part of this specification, and then more specifically defined in the claims at the end of the description.

In the accompanying drawings, wherein similar reference characters are used to designate corresponding parts throughout the several views:—

Figure 1 is an end view of a countersink made substantially in accordance with this invention.

Fig. 2 is an elevation thereof.

Fig. 3 is a section on the line III—III of Fig. 1.

Fig. 4 is a detailed elevation of the inner member of the tool, and

Fig. 5 is a detailed view of the adjustable stop with the portion of the tool carrying the same in section.

The tool comprises two main portions, an inner member 1 having a shank 2 and conical head 3, and a fixed sleeve member 4 shrunk or otherwise secured around the edge of the conical head and having a flange 5 extending along and spaced from the shank 2. The portion of the shank which is overlapped by the flange 5 is threaded at 6 and on it is adjustably mounted a collar 7.

In the sides of the conical end portion or head 3 inclined grooves 8 are formed, three such grooves being shown spaced equidistant apart around the head. Recesses 9, constituting continuations of said grooves, extend through the meeting portions of the head and sleeve 4, so that the cutters or knives 10 may be fitted in said grooves and recesses with their beveled cutting edges 11 projecting slightly from the end of the conical head and their inner ends 12 extending into the annular space 13 between the flange 5 and shank.

All of the cutters or knives 10 are made alike in length as well as other dimensions, so that by screwing the collar 7 into contact with the inner ends 12 of all of said cutters, the latter may be evenly adjusted to cut equally, and when their cutting edges 11 become worn down said cutters may be uniformly projected in order to provide the proper clearance. The conical head may be cut away as at 14 in advance of each cutter in order to allow clearance for the shavings. When the cutters are properly adjusted, they may be locked in position by set screws 15 inserted through internally threaded bores in the sleeve member 4.

The depth of the countersink to be cut may be regulated by a stop pin or bolt 16 which may be screwed into a longitudinal passage 17 in the head 3 behind one of the cutters, or may be otherwise adjustably carried by said head or sleeve. As shown in Fig. 5, said stop 16 may be locked in adjusted position by a set screw 18. The collar 7 may also be locked in adjusted position by a set screw 19, Fig. 2. The provision of the adjustable stop 16 not only permits the tool to be arrested when it has cut a particular countersink to the desired depth, but by retaining said desired adjustment any number of countersinks may be cut to a uniform depth or size.

Having thus described my invention, what I claim as new and desire to secure by Letters Patent of the United States is:—

1. In a countersink, the combination with a shank and a head thereon, of a flange carried by the head and extending concentrically along the shank in spaced relation thereto, cutters mounted on the head and extending into the space between the same and the flange, and a collar adjustable on the shank within said flange for alining the cutters.

2. In a countersink, the combination with a shank and a head thereon, of a flange carried by the head and extending concentrically along the shank in spaced relation thereto, cutters mounted on the head and extending through the same into the space between the shank and flange, and a collar adjustable on the shank within said flange for alining the cutters, the inner ends of the cutters being inclosed by said flange and collar.

3. In a countersink, the combination with a shank, of a head consisting of a conical portion and a marginal portion larger in diameter than said conical portion and arranged at the base thereof, cutters mounted on the conical portion, and an adjustable stop mounted in the marginal portion of the head and extending along said conical portion for limiting the entrance of the tool into the work.

In testimony whereof I have signed my name to this specification.

MARSELIUS J. LOGAN.